US008520151B2

(12) United States Patent
Correa et al.

(10) Patent No.: US 8,520,151 B2
(45) Date of Patent: Aug. 27, 2013

(54) REDUCTION OF PHOSPHOR LAG ARTIFACTS ON DISPLAY DEVICES

(75) Inventors: Carlos Correa, Villingen-Schwenningen (DE); Cedric Thebault, Chanrepie (FR)

(73) Assignee: Thomson Licensing, Issy-les-Moulineaux (FR)

( * ) Notice: Subject to any disclaimer, the term of this patent is extended or adjusted under 35 U.S.C. 154(b) by 546 days.

(21) Appl. No.: 12/798,947

(22) Filed: Apr. 14, 2010

(65) Prior Publication Data

US 2010/0265395 A1 Oct. 21, 2010

(30) Foreign Application Priority Data

Apr. 17, 2009 (EP) .................................... 09305333

(51) Int. Cl.
*H04N 5/16* (2006.01)
*H04N 9/12* (2006.01)
*G09G 3/30* (2006.01)

(52) U.S. Cl.
USPC ............ 348/797; 348/620; 348/621; 345/77; 345/78

(58) Field of Classification Search
USPC .................... 348/797, 208.13, 280, 739, 799, 348/800–803, 790, 791, 808, 810, 655, 525–631; 345/60, 63, 76, 589, 74.1–79, 83, 87, 88, 345/90, 99, 101; 313/483–486, 496
See application file for complete search history.

(56) References Cited

U.S. PATENT DOCUMENTS

| | | | | |
|---|---|---|---|---|
| 6,377,232 | B1 | 4/2002 | Chevet et al. | |
| 2004/0169732 | A1* | 9/2004 | Weitbruch et al. | 348/208.13 |
| 2006/0192786 | A1* | 8/2006 | Yamada | 345/589 |

FOREIGN PATENT DOCUMENTS

| | | | |
|---|---|---|---|
| EP | 1675089 | A1 | 6/2006 |
| EP | 1684258 | A1 | 7/2006 |
| EP | 1708157 | A2 | 10/2006 |
| EP | 2028638 | A1 | 2/2009 |

OTHER PUBLICATIONS

European Search Report for EP 09 30 5333 dated Oct. 9, 2009.

* cited by examiner

*Primary Examiner* — Michael Lee
(74) *Attorney, Agent, or Firm* — Tutunjian & Bitetto, P.C.

(57) ABSTRACT

Luminous elements of the three colors red, green and blue of video display devices have a different response time. Therefore, a colored edge and trail appear at edges in direction of a moving object. In order to reduce the disturbing character of such colored edges and trails, a horizontal spatial equalization of the response time of luminous elements having a shorter response time by low-pass filtering a component signal of the video component signals for driving luminous elements having a shorter response time dependent on a horizontal speed of changes of the component signal is recommended to reduce phosphor lag artifacts on display devices. The arrangement for processing video component signals of different color comprises a compensation unit which according to a preferred embodiment is realized by a FIR filter and a horizontal speed correction unit supplied with a horizontal and vertical motion estimation signal.

13 Claims, 6 Drawing Sheets

REDUCTION OF PHOSPHOR LAG ARTIFACTS ON DISPLAY DEVICES

Figure 1:
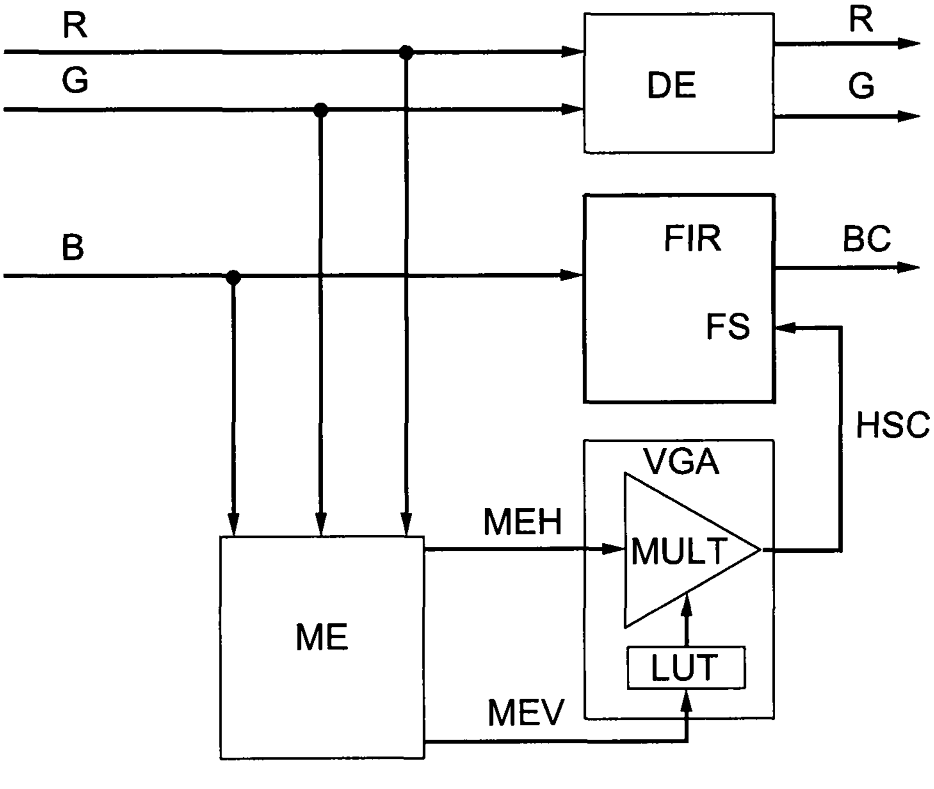

This application claims the benefit, under 35 U.S.C. §119 of European Patent Application 09305333.8, filed Apr. 17, 2009.

FIELD OF THE INVENTION

The present invention relates to an arrangement and a method for processing video signals to be displayed on a display device having at least two kinds of luminous elements with different response time.

BACKGROUND

It is well known that luminous elements of the three colours red, green and blue have a different response time. Response time is the time, which the luminous element takes to react to a given input. The differences in the response time are the reason that a coloured trail/edge appears as an artificial colour behind an edge and at the front edge of a white object moving in front of a black background on a display device. Luminous elements of different colour like the three phosphors of a plasma display have different chemical properties and are different concerning the response time, which generates artifacts as coloured trails and edges especially visible at moving black/white edges due to the so-called phosphor lag. In order to reduce the disturbing character of such coloured trails/edges, it already has been recommended to detected moving edges and to add an artificial trail behind these edges in order to discolour it. However, such solutions require a significant amount of line memories, which make it expensive, and require the use an edge detector which is typical sensitive to noise. Furthermore, it has been recommended to shift sub-fields of the three colour components differently whereby a moving vector indicating moving objects between two successive images is used to displace sub-fields dependent on movement and type of the phosphor. However, a moving vector is required and sub-field shifting is limited to the pixel resolution. Therefore, it already has been recommended to use different groups of sub-fields for displaying a video image for at least two types of phosphor. It reduces the length of the colour trail; however, it does not handle its discoloration. Already long time ago, it has been recommended to correct differences in persistence of the phosphors in a colour image display screen by detecting transitions between a first grey level and an adjacent second grey level and if the transition is greater than a threshold to force the state of the cell covered with a persistent phosphor to the second grey level before the end of the frame period, see e.g. U.S. Pat. No. 6,377,232. Furthermore, anti-motion blur filtering of the input video signal has been recommended. As the viewer of moving objects on a matrix display integrates the intensity of the pixels along the motion trajectory, motion blur may be reduced by enhancing high spatial frequencies of moving objects, which cause noise enhancement and noise modulation. Therefore, said anti-motion blur filtering is also based on detecting edge characteristics in each image of the input video signal.

Invention

It is an aspect of the invention to provide an arrangement and a method for processing video signals to be displayed on a display device having at least two kinds of luminous elements with different response time with less expenditure and high efficiency in reducing phosphor lag artifacts at edges of moving objects suffering from phosphor lag artifacts on display devices.

It is a further aspect of the invention to make it possible to remedy afterglow defects of moving objects on display devices, such as coloured edges or trails at black-white or white-black transitions to reduce phosphor lag artifacts on display panels without edge detection of the moving object, without a significant amount of line memories and with improved noise performance.

This object is achieved by means of the features specified in independent claims. Advantageous designs and developments are specified in dependent claims.

Although less effective edge detection shall not be used to discolour edges of a moving object suffering from the phosphor lag effect, a specific low-pass filtering of the colour component of the video signal, which corresponds to the fastest luminous element of the display device, is recommended. Said specific low-pass filtering of the colour component of the video signal corresponding to the fastest luminous element is performed dependent on the horizontal speed of the moving object although of course an object may move in all directions on a display panel. That means that the present invention starts from the assumption that phosphor lag occurs only in horizontal direction, which is of course not true as of course an object may move in all directions and not all contours of a moving object suffering from said phosphor lag effect as it will be shown in a detailed description of embodiments below. However, although there are said contradictions, a horizontal spatial equalisation of the response time of luminous elements with different response time is recommended.

It is well known that a motion estimator is able to provide motion vector signals representing the movement of an object on the display panel. Motion vector signals or data representing the movement of an object on the display panel may be generated from the video signal or are already available in the video signal. Said motion vectors are representative for the moving speed of an object to be displayed on the display device in horizontal and vertical direction. Therefore, in a first glance it could be assumed that it would be sufficient to use the horizontal motion vector for phosphor lag compensation. However, there are also edges of a moving object, which do not suffer from the phosphor lag effect. Therefore, a horizontal speed correction unit is recommended which reduces the horizontal motion vector in case that the moving object has also a vertical moving component. Furthermore, for said specific low-pass filtering the use of a FIR-filter is recommended, wherein the filter coefficients are determined pixel-by-pixel according to the horizontal speed magnitude of a central pixel. That means that for each speed one set of coefficients is determined, which is calculated according to equations and conditions shown below. The function of the FIR filter is to emulate a trailing trail following moving edges at least for the colour component in the video signal, which corresponds to the fastest luminous element of the display panel. According to an exemplary embodiment, wherein blue luminous elements of the display device are the fastest, which means have a response time shorter than the response time of red and green luminous elements, which both have nearly the same response time, it is sufficient to apply said specific low-pass filtering with the recommended FIR-filter only for the blue channel. As the FIR filter has to emulate a trailing trail following moving edges for each speed, the set of coefficients is always one sided: for left-to-right motion speeds, only the coefficients that apply to the centre and right pixels are different from zero; and for right-to-left motion speeds, only the coefficients that apply to the centre and left pixels are different from zero. The reason why for left-to-right motions the right pixels are non-zero is that for a given center pixel the trail occurs when the moving object has passed by, and is therefore already located to the right of the center pixel.

The FIR filter coefficients are obtained by applying the following equations and conditions:

$$a_0 = 1 - \exp\left(-\frac{\alpha}{|v|}\right)$$

$$a_{n+1} = a_n * \exp\left(-\frac{\alpha}{|v|}\right),$$

wherein $a_0$ denotes a centre pixel coefficient—the current pixel, and $a_n$ denotes either the left or the right coefficients dependent on the moving direction. $|v|$ denotes the speed amplitude in pixels per frame, and $\alpha$ is a constant that denotes the magnitude of the required correction for a specific panel technology.

Furthermore, for all values of v and $\alpha$ it shall be ensured that $$\sum_{n=0}^{\infty} a_n = 1,$$

which means, that for a specific speed, the sum of all coefficients shall be always equal to 1. For cases, where the sum of coefficients is different from one, the coefficients are multiplied with a constant value to ensure that the filter gain is always equal to 1. Said filter gain of the FIR filter equal to 1 has to be ensured so that an input video flat field is not modified by the FIR filter. The above-mentioned constant $\alpha$, which denotes the magnitude of the required correction, is a function of the technology for which the recommended method and arrangement shall be applied. The constant $\alpha$ has to be experimentally discovered for a best result and is dependent on the video frame rate and the response time of the luminous elements, which shall be equalized. For a plasma display panel technology, where the response time of luminous elements of the blue colour component is much shorter in comparison to red and green, which have about the same response time, a value of about four has been discovered as it will be shown in an exemplary embodiment. This is a typical example for plasma display panel, however, the recommended arrangement and method are also applicable to display panel of other technologies, wherein luminous elements with different response time are used, the colour of the fastest luminous element is different to blue or several luminous elements have different response time.

As shown above, a horizontal spatial equalisation of the response time of luminous elements with different response time is recommended to reduce phosphor lag artifacts on display devices by providing a sliding average value of at least one color component signal of the video signal, which represents luminous elements with a shorter response time, dependent on a horizontal speed signal generated from a horizontal motion vector signal attenuated by a vertical motion vector signal. Said horizontal and vertical motion vector signals represent the speed of an object moving on the display device. The horizontal motion vector signal is attenuated by a vertical motion vector signal to ensure that phosphor delay compensation will be manly applied to edges of horizontally moving objects. Providing a sliding average value of at least one color component signal of the video signal means that a sum of a certain number of successive video signal values is generated, which is divided by said number of values and that said group of values is continuously shifted by one value and a new average value is formed. Result of said filtering are filtered values similar to a low-pass behavior of the color component signal of the video signal, which controls the luminous elements having the shorter response time.

It has been found that low-pass filtering the colour component signal of a video signal, which corresponds to the fastest colour component of a display device, dependent on a horizontal moving speed signal generated from motion vectors of a moving object to be displayed on the display device is an efficient method to reduce phosphor artifacts and to discolour edges or trails at black-white or white-black transitions of the moving object to be displayed on the display device. The recommended method and a device to perform said method require little expenditure by realisation with a horizontal working FIR filter. Line memories and an edge detector are not needed, so that a high expenditure for phosphor lag compensation is avoided. Furthermore, the recommended phosphor lag compensation is less sensitive to noise and requires little expenditure as the compensation is performed in horizontal direction and in case of most plasma displays, for one colour channel only. It is applicable for any display technology where the time response of different colour elements of the display is not the same for all colours.

DRAWINGS

Exemplary embodiments of the invention are illustrated in the drawings and are explained in more detail in the following description.

Figure 2:
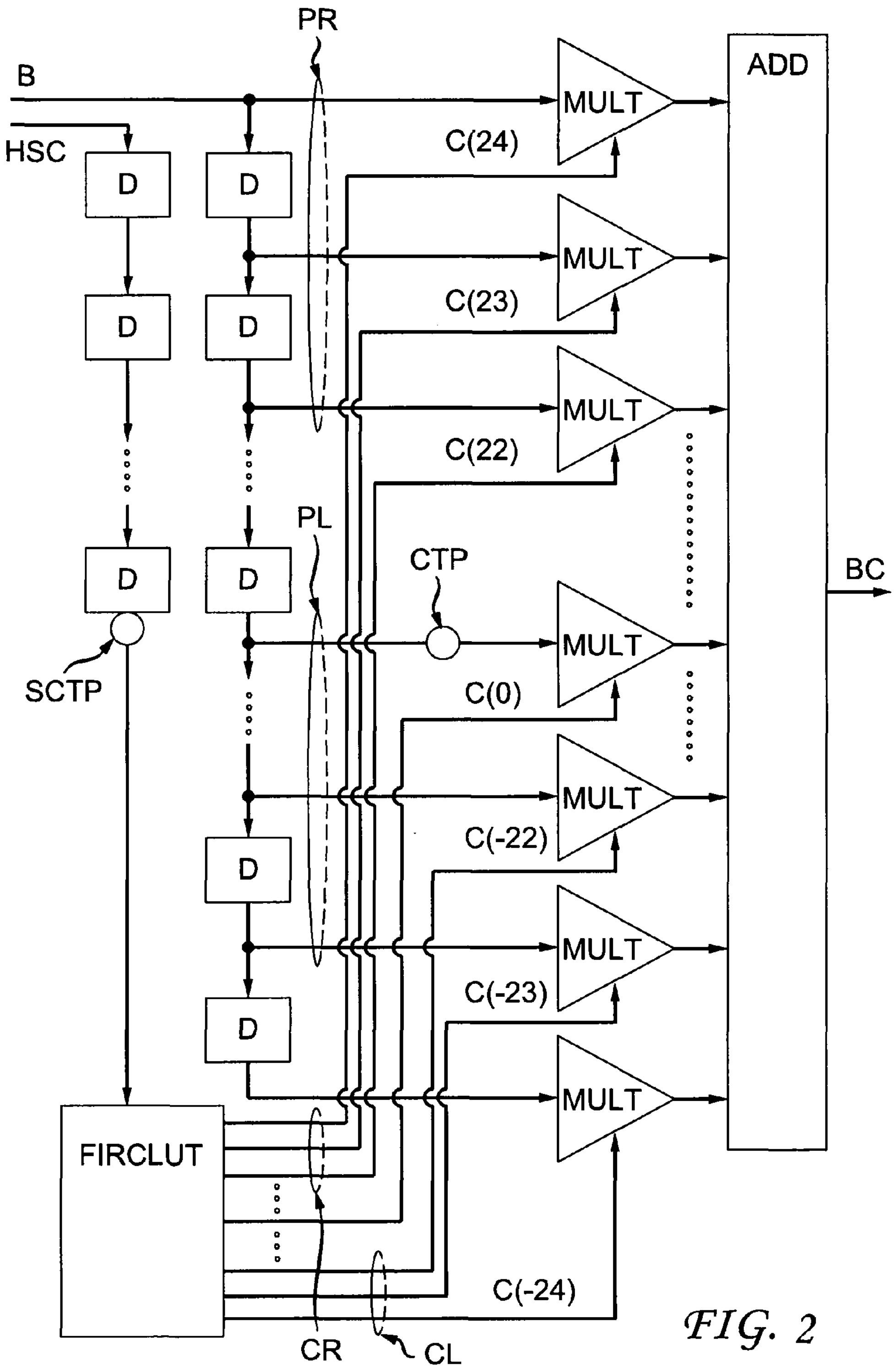
Figure 3:
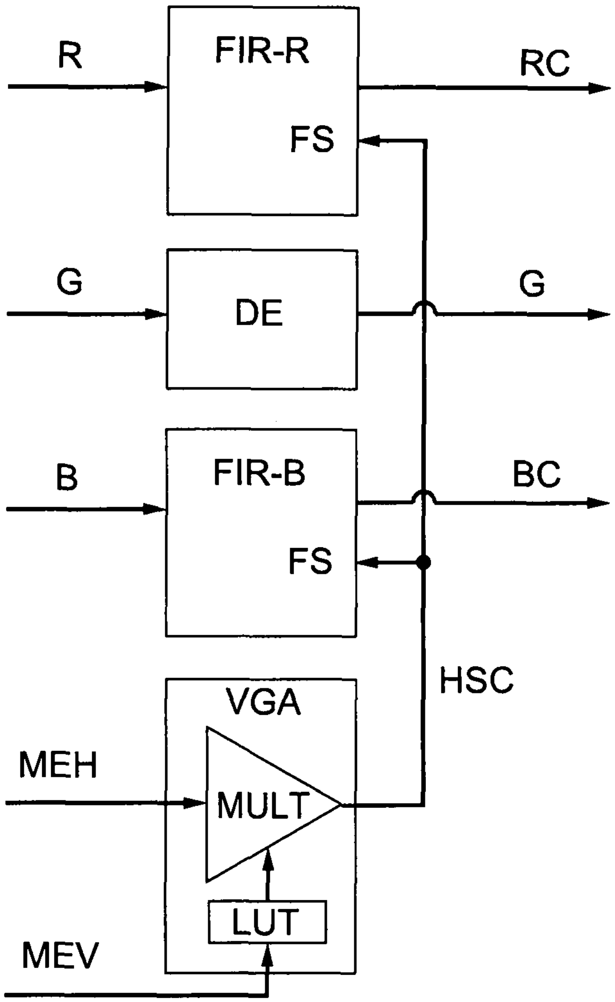
Figure 4:
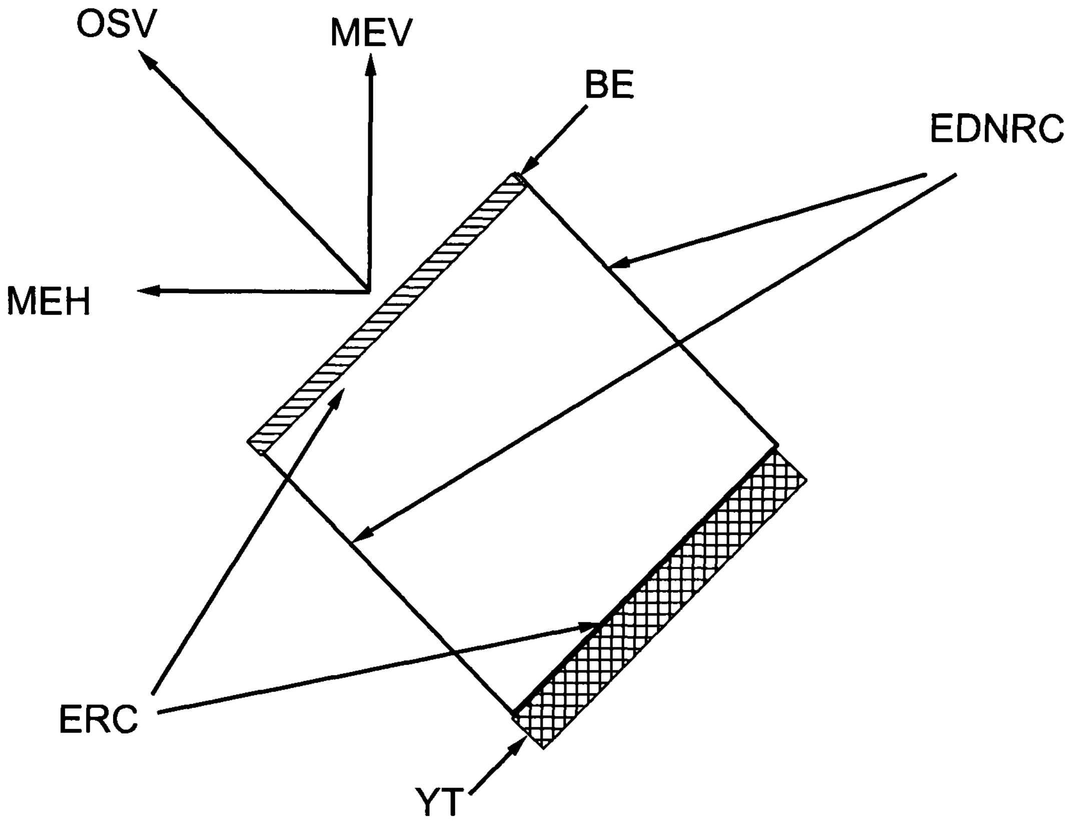
Figure 5:
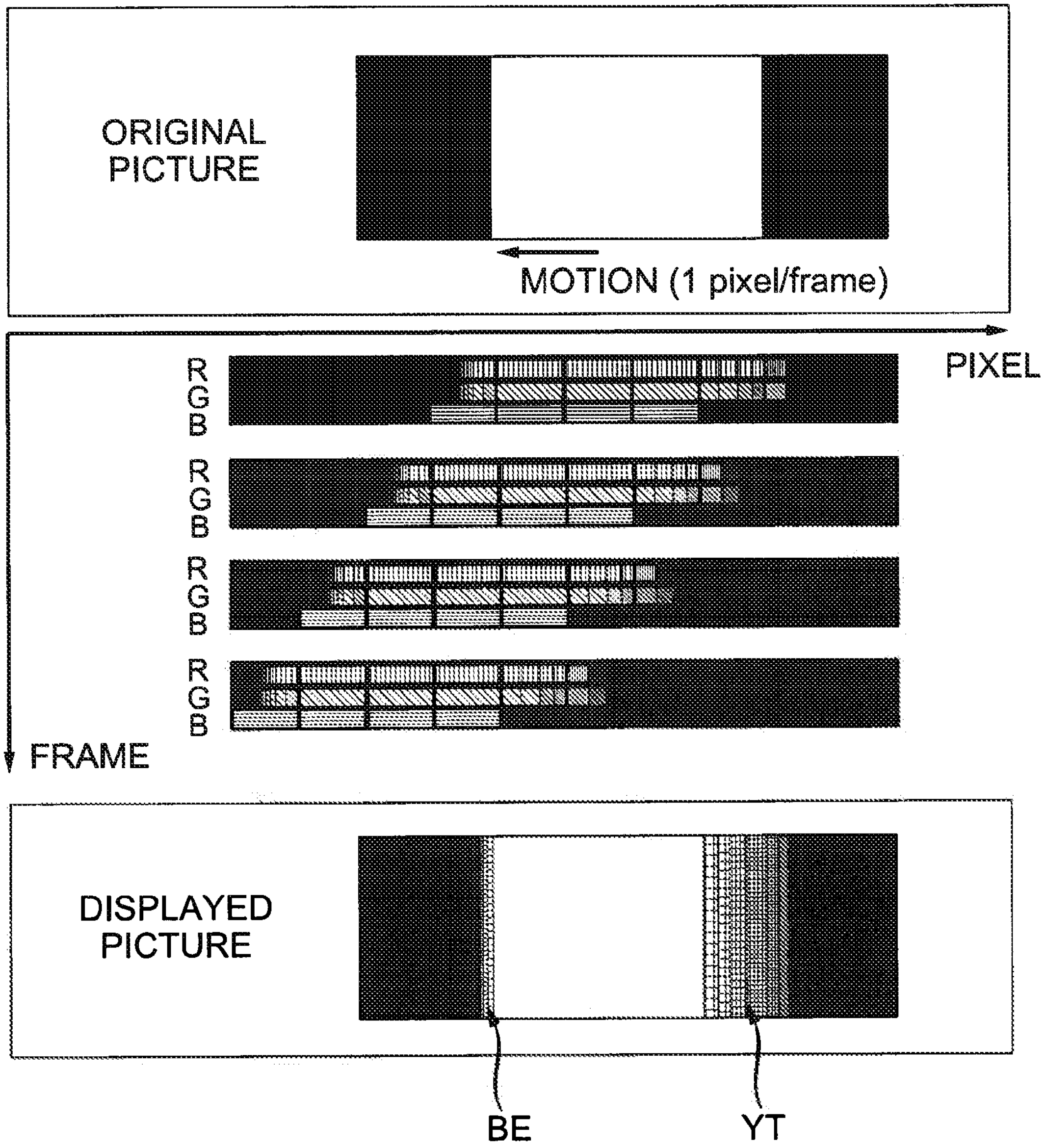
Figure 6:
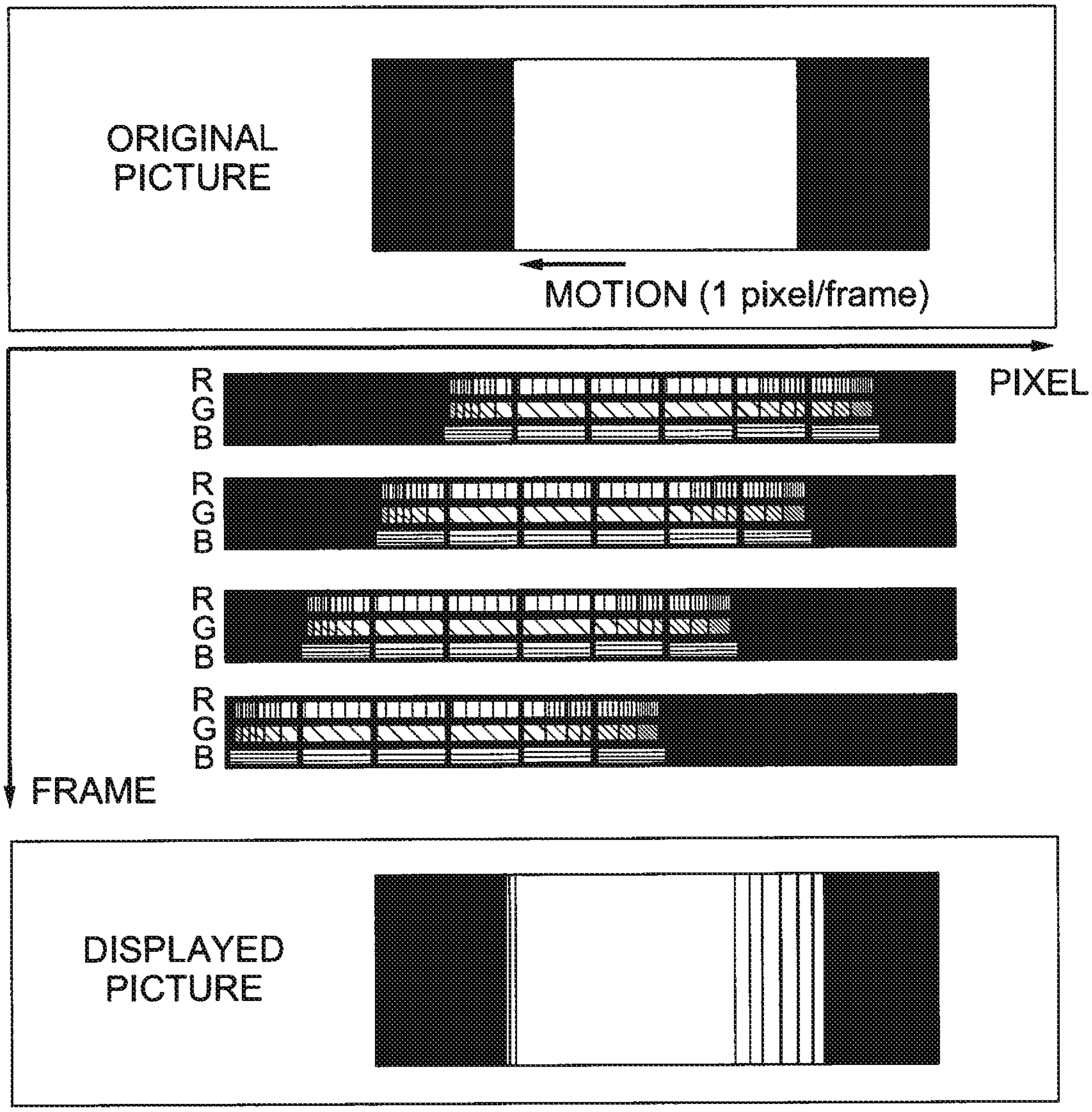

FIG. 1 shows a block diagram of an apparatus for processing video signals representing a moving object to be displayed on a display device according to the present invention, FIG. 2 shows a block diagram of an FIR—filter for phosphor lag compensation according to the present invention, FIG. 3 shows a block diagram of an apparatus for phosphor lag compensation of two colours, FIG. 4 shows a slanted square moving diagonally, components of the moving speed and edges of said moving object suffering and do not suffer from the phosphor lag effect, FIG. 5 illustrates the phosphor lag effect of a moving object on a display panel in comparison to an original picture, FIG. 6 illustrates the compensated phosphor lag effect of a moving object on a display panel in comparison to the original picture according to the present invention.

EXEMPLARY EMBODIMENTS

Like numerals and characters designate like elements throughout the figures of the drawings.

Reference is initially directed to FIG. 4, which generally illustrates a slanted square, which moves diagonally on the display device as it is illustrated by an object speed vector OSV. A diagonal movement has a horizontal and a vertical speed component, which are provided by a motion estimator as a horizontal moving estimation signal MEH and a vertical moving estimation signal MEV. Edges of the moving object about orthogonal to said object speed vector OSV suffering from the phosphor lag effect as e.g. the first edge in moving direction of a white object becomes displayed as a blue edge BE and the last edge in moving direction becomes displayed as a yellow trail YT on the display device. On the other hand areas inside the square and side lines of the square moving parallel to the object speed vector OSV except the start and end point do not suffer from the phosphor lag effect. That means that a moving object has edges or contours ERC, which require phosphor lag compensation and has edges or contours EDNRC, which do not require phosphor lag compensation. Therefore, if phosphor delay compensation becomes applied to the whole picture by using the horizontal moving estimation signal MEH all four edges would be compensated. Furthermore, if phosphor compensation becomes applied to those edges that do not require compensation it creates phosphor lag artifacts where they not occurred before. Nevertheless, a horizontal spatial equalisation of the response time of luminous elements with different response time by low-pass filtering a component signal B of the video component signals R, G, B for driving luminous elements having a shorter response time is recommended, without edge detection and without line memories, which require a high expenditure and with improved noise performance. Said low-pass filtering is performed dependent on a horizontal speed of changes of the component signal B to reduce phosphor lag artifacts on display devices by using a FIR filter FIR as it is illustrated for an exemplary embodiment in FIG. 1. In most plasma displays, blue luminous elements of the display device are the fastest, which means have a response time shorter than the response time of red and green luminous elements as it is shown in FIG. 5 for not compensated video component signals R, G, B. FIG. 5 shows an original picture of a white square on a black background in motion with one pixel per frame and the illumination of the pixel for four frames, which cause a blue edge BE and a yellow trail YT in the displayed picture on the display device. That means that video component signals R, G, B of different colour are displayed with artifacts on a display device having at least two kinds of luminous elements with different response time. Blue pixel illuminate earlier in comparison to red and green so that a viewer in the direction in which the square moves at first recognises the blue colour. The yellowish trail behind the bright to dark transition is formed from red and green pixels, which generate the yellow trail YT because due to the lower response time said pixel illuminate for a longer duration in comparison to the blue pixel. Therefore, it is an object of the invention to make the artifacts less disturbing for a customer by suppressing the unnatural colours of said trails effective and with low expenditure. As shown in FIG. 2, a component signal B of the video component signals R, G, B for driving luminous elements having a shorter response time is applied to a compensation unit, which provides a corrected component signal BC for driving luminous elements having a shorter response time. FIG. 2 illustrates details of the compensation unit, which according to the exemplary embodiment shown in FIG. 1 is an FIR filter FIR. As illustrated in FIG. 1, component signal B is applied to the FIR filter FIR, which provides the corrected component signal BC of video component signals R, G, B of different colour to be displayed on the display device. Said FIR filter FIR is connected with a horizontal speed correction unit, which for example is a variable gain amplifier VGA supplied with a horizontal motion estimation signal MEH and a vertical motion estimation signal MEV for providing a horizontal speed corrected signal HSC controlling said compensation unit FIG. 2 and FIR filter FIR respectively. The horizontal and vertical motion estimation signal MEH and MEV are provided by a motion estimator ME, which generates said signals from video component signals R, G, B as shown in FIG. 1. However, also motion estimator ME, which generate horizontal and vertical motion estimation signals MEH and MEV from less than the tree video component signals R, G, B are applicable. A motion estimator ME provides for each pixel the best estimate for the horizontal motion vector and for the vertical motion vector. In case that said motion estimation signals MEH and MEV are already available in addition to the video component signals R, G, B or have been generated for other purposes as shown for a further embodiment illustrated in FIG. 3, a motion estimator ME is not required. The variable gain amplifier VGA illustrated in FIG. 1 and FIG. 3 comprises a multiplier MULT supplied with the horizontal motion estimation signal MEH and a lookup table LUT supplied by the vertical motion estimation signal MEV for controlling the gain of the variable gain amplifier VGA, which according to said exemplary embodiments forms said horizontal speed correction unit. According to the invention a horizontal spatial equalisation of the response time of luminous elements with different response time is recommended as phosphor lag compensation is mainly necessary in horizontal direction because most fast movements, which create phosphor lag artifacts are horizontal or have a very small vertical motion component. However, in case of diagonal movements the phosphor compensation circuit will not work properly, because the FIR filter block will combine uncorrelated video data. Therefore, said horizontal speed correction unit as for example a variable gain amplifier VGA is provided that reduces values of the horizontal moving component—the horizontal motion estimation signal MEH—for larger vertical values. A table below shows an example for the content of the lookup table LUT for gain control. For vertical speeds of a moving object up to two lines per frame—the vertical motion estimation signal MEV—, the gain value is set to one, and for higher vertical speeds of the moving object the gain is reduced gradually.

| Vertical speed in lines per frame | gain |
|---|---|
| 0 | 1.0 |
| 1 | 1.0 |
| 2 | 1.0 |
| 3 | 0.66 |
| 4 | 0.5 |
| 5 | 0.4 |
| 6 | 0.33 |
| . . . | |
| 10 | 0.2 |
| . . . | |

The reason why the horizontal motion estimation signal MEH has to be reduced by the vertical motion estimation signal MEV already has been illustrated above in connection with FIG. 4.

As shown for an exemplary embodiment in FIG. 1, the blue component—the component signal B—of the video component signals R, G, B is the only component that is filtered with the FIR filter FIR. This is typically for plasma display devices, however, the invention also applicable for other display devices and technologies, where the colour component to be filtered will be another one or several colour components have to be filtered as it is shown for a further embodiment illustrated in FIG. 3. As shown in FIG. 1, the component signal B to be filtered is applied to the FIR filter FIR including a filter selector FS supplied by the horizontal speed corrected signal HSC for selecting a set of filter coefficients according to the applied horizontal speed corrected signal HSC. The exemplary embodiments shown in FIG. 1 and FIG. 3 comprise furthermore a delay equaliser DE for delaying component signals, which have not to be filtered for duration equal to a duration, which the FIR filter FIR needs for processing the component signal to be filtered. According to the arrangement illustrated in FIG. 3, the component signals for green G and according to the arrangement illustrated in FIG. 1 component signals for red and green R and G, which have not to be filtered, are applied to such a delay equaliser DE. The embodiment illustrated in FIG. 3 has a first FIR filter FIR-B for blue component signals B and a second FIR-filter FIR-R for red component signals R, which provide correspondingly a first corrected component signal BC and a second corrected component signal RC. Such an embodiment is especially applicable if e.g. three luminous elements of the display device have different response time. In such a case both the first FIR filter FIR-B and the second FIR-filter FIR-R are connected with the horizontal speed correction unit providing the horizontal speed corrected signal HSC for controlling the first FIR filter FIR-B and the second FIR-filter FIR-R, each being a compensation unit illustrated in FIG. 2. Said first FIR filter FIR-B and the second FIR-filter FIR-R have the same structure, however, are different concerning a FIR-filter coefficient lookup-table FIRCLUT used in said FIR filters as FIR-filter coefficients according to the different response time also will be different for a certain horizontal speed corrected signal HSC. That means that in an arrangement, which requires several compensation units, each compensation unit has a FIR-filter coefficient lookup-table FIRCLUT wherein sets of filter coefficients for a certain horizontal speed corrected signal HSC are different. As shown in FIG. 2, the horizontal speed corrected signal HSC is applied to the coefficient lookup-table FIRCLUT via a delay means D applying the horizontal speed corrected signal HSC with a delay corresponding to a delay of a central tap pixel CTP to the FIR-filter coefficient lookup-table FIRCLUT. Delay means D and coefficient lookup-table FIRCLUT form a filter selector FS of the compensation unit. Said delay means D also may be formed from several delay means D as shown in FIG. 2. The FIR-filter FIR is a standard digital FIR filter with a characteristic that the filter coefficients are determined pixel-by-pixel by the horizontal speed magnitude of a central pixel. The abbreviation FIR in the term FIR-filter means that the filter is a finite impulse response filter and the component signal B of the video component signals R, G, B of different colour to be displayed on a display device for driving luminous elements having a shorter response time is applied to the input of the FIR filter FIR as shown in FIG. 2. The FIR-filter FIR has a number of serial connected delay means D or so-called latches and a number of multipliers MULT each connected to a delay means D for multiplying a filter coefficient C with an input value provided by a delay means D. The outputs of the multipliers MULT are connected to an adder ADD, which forms a sum of the output values of the multipliers MULT and provides the corrected component signal BC for driving luminous elements and pixel respectively having a shorter response time. In the exemplary embodiment illustrated in FIG. 2, the component signal B is the blue channel of the video component signals R, G, B represented by 10 bits and the FIR filter FIR has for example 49 coefficients C. The FIR coefficients are obtained by applying the following equations and conditions:

$$a_0 = 1 - \exp\left(-\frac{\alpha}{|v|}\right)$$

$$a_{n+1} = a_n * \exp\left(-\frac{\alpha}{|v|}\right),$$

wherein $a_0$ denotes a centre pixel coefficient—the current pixel, and $a_n$ denotes either the left or the right coefficients dependent on the moving direction. |v| denotes the speed amplitude in pixels per frame, and α is a constant that denotes the magnitude of the required correction for a specific panel technology.

Furthermore, for all values of v and α it shall be ensured that $$\sum_{n=0}^{\infty} a_n = 1,$$

which means, that for a specific speed, the sum of all coefficients shall be always equal to 1. The above-mentioned constant α, which denotes the magnitude of the required correction, is a function of the technology for which the recommended method and arrangement shall be applied. The constant α has to be experimentally discovered for a best result and is dependent on the video frame rate and the response time of the luminous elements, which shall be equalized. For a plasma display panel technology, where the response time of luminous elements of the blue colour component is much shorter in comparison to red and green, which have about the same response time, a value of about four has been discovered as it will be shown below. The function of the FIR filter is to emulate a trailing trail following moving edges for the blue channel. For this reason, and for each speed, the set of coefficients C is always one sided: for left-to-right motion speeds, only the coefficients that apply to the centre C(0) and right pixels PR are different from zero; and for right-to-left motion speeds, only the coefficients C that apply to the centre C(0) and left pixels PL are different from zero. That means for left to right speeds (v>0):

```
        if (n<0)
                C(n) = 0        // left pixel coefficients
        else
                C(n) = a(n)     // right pixel coefficients
    and for right to left speeds (v < 0):
        if (n<=0)
                C(n) = a(−n)    // for n<0 −n>0
        else
                C(n) = 0        // right pixel coefficients
```

By taking into account the conditions mentioned above, filter coefficients C as shown in a table below are determined.

| | Motion speed (Pixels per frame) | | | | | | | | | | |
|---|---|---|---|---|---|---|---|---|---|---|---|
| | right-to-left | | | | | | left-to-right | | | | |
| | −40 | −32 | −24 | −16 | −8 | 0 | 8 | 16 | 24 | 32 | 40 |
| C(24) | 0 | 0 | 0 | 0 | 0 | 0 | 0.000 | 0.001 | 0.003 | 0.006 | 0.009 |
| C(23) | 0 | 0 | 0 | 0 | 0 | 0 | 0.000 | 0.001 | 0.003 | 0.007 | 0.010 |

-continued

| | Motion speed (Pixels per frame) | | | | | | | | | | |
|---|---|---|---|---|---|---|---|---|---|---|---|
| | right-to-left | | | | | | left-to-right | | | | |
| | −40 | −32 | −24 | −16 | −8 | 0 | 8 | 16 | 24 | 32 | 40 |
| C(22) | 0 | 0 | 0 | 0 | 0 | 0 | 0.000 | 0.001 | 0.004 | 0.008 | 0.011 |
| C(21) | 0 | 0 | 0 | 0 | 0 | 0 | 0.000 | 0.001 | 0.005 | 0.009 | 0.012 |
| C(20) | 0 | 0 | 0 | 0 | 0 | 0 | 0.000 | 0.001 | 0.005 | 0.010 | 0.013 |
| C(19) | 0 | 0 | 0 | 0 | 0 | 0 | 0.000 | 0.002 | 0.006 | 0.011 | 0.014 |
| C(18) | 0 | 0 | 0 | 0 | 0 | 0 | 0.000 | 0.002 | 0.008 | 0.012 | 0.016 |
| C(17) | 0 | 0 | 0 | 0 | 0 | 0 | 0.000 | 0.003 | 0.009 | 0.014 | 0.017 |
| C(16) | 0 | 0 | 0 | 0 | 0 | 0 | 0.000 | 0.004 | 0.011 | 0.016 | 0.019 |
| C(15) | 0 | 0 | 0 | 0 | 0 | 0 | 0.000 | 0.005 | 0.013 | 0.018 | 0.021 |
| C(14) | 0 | 0 | 0 | 0 | 0 | 0 | 0.000 | 0.007 | 0.015 | 0.020 | 0.023 |
| C(13) | 0 | 0 | 0 | 0 | 0 | 0 | 0.001 | 0.009 | 0.018 | 0.023 | 0.026 |
| C(12) | 0 | 0 | 0 | 0 | 0 | 0 | 0.001 | 0.011 | 0.021 | 0.026 | 0.029 |
| C(11) | 0 | 0 | 0 | 0 | 0 | 0 | 0.002 | 0.014 | 0.025 | 0.030 | 0.032 |
| C(10) | 0 | 0 | 0 | 0 | 0 | 0 | 0.003 | 0.018 | 0.029 | 0.034 | 0.035 |
| C(9) | 0 | 0 | 0 | 0 | 0 | 0 | 0.004 | 0.023 | 0.034 | 0.038 | 0.039 |
| C(8) | 0 | 0 | 0 | 0 | 0 | 0 | 0.007 | 0.030 | 0.040 | 0.043 | 0.043 |
| C(7) | 0 | 0 | 0 | 0 | 0 | 0 | 0.012 | 0.038 | 0.048 | 0.049 | 0.047 |
| C(6) | 0 | 0 | 0 | 0 | 0 | 0 | 0.020 | 0.049 | 0.056 | 0.056 | 0.052 |
| C(5) | 0 | 0 | 0 | 0 | 0 | 0 | 0.032 | 0.063 | 0.067 | 0.063 | 0.058 |
| C(4) | 0 | 0 | 0 | 0 | 0 | 0 | 0.053 | 0.081 | 0.079 | 0.071 | 0.064 |
| C(3) | 0 | 0 | 0 | 0 | 0 | 0 | 0.088 | 0.104 | 0.093 | 0.081 | 0.070 |
| C(2) | 0 | 0 | 0 | 0 | 0 | 0 | 0.145 | 0.134 | 0.110 | 0.092 | 0.078 |
| C(1) | 0 | 0 | 0 | 0 | 0 | 0 | 0.239 | 0.172 | 0.130 | 0.104 | 0.086 |
| C(0) | 0.095 | 0.118 | 0.154 | 0.221 | 0.393 | 1.000 | 0.393 | 0.221 | 0.154 | 0.118 | 0.095 |
| C(−1) | 0.086 | 0.104 | 0.130 | 0.172 | 0.239 | 0 | 0 | 0 | 0 | 0 | 0 |
| C(−2) | 0.078 | 0.092 | 0.110 | 0.134 | 0.145 | 0 | 0 | 0 | 0 | 0 | 0 |
| C(−3) | 0.070 | 0.081 | 0.093 | 0.104 | 0.088 | 0 | 0 | 0 | 0 | 0 | 0 |
| C(−4) | 0.064 | 0.071 | 0.079 | 0.081 | 0.053 | 0 | 0 | 0 | 0 | 0 | 0 |
| C(−5) | 0.058 | 0.063 | 0.067 | 0.063 | 0.032 | 0 | 0 | 0 | 0 | 0 | 0 |
| C(−6) | 0.052 | 0.056 | 0.056 | 0.049 | 0.020 | 0 | 0 | 0 | 0 | 0 | 0 |
| C(−7) | 0.047 | 0.049 | 0.048 | 0.038 | 0.012 | 0 | 0 | 0 | 0 | 0 | 0 |
| C(−8) | 0.043 | 0.043 | 0.040 | 0.030 | 0.007 | 0 | 0 | 0 | 0 | 0 | 0 |
| C(−9) | 0.039 | 0.038 | 0.034 | 0.023 | 0.004 | 0 | 0 | 0 | 0 | 0 | 0 |
| C(−10) | 0.035 | 0.034 | 0.029 | 0.018 | 0.003 | 0 | 0 | 0 | 0 | 0 | 0 |
| C(−11) | 0.032 | 0.030 | 0.025 | 0.014 | 0.002 | 0 | 0 | 0 | 0 | 0 | 0 |
| C(−12) | 0.029 | 0.026 | 0.021 | 0.011 | 0.001 | 0 | 0 | 0 | 0 | 0 | 0 |
| C(−13) | 0.026 | 0.023 | 0.018 | 0.009 | 0.001 | 0 | 0 | 0 | 0 | 0 | 0 |
| C(−14) | 0.023 | 0.020 | 0.015 | 0.007 | 0.000 | 0 | 0 | 0 | 0 | 0 | 0 |
| C(−15) | 0.021 | 0.018 | 0.013 | 0.005 | 0.000 | 0 | 0 | 0 | 0 | 0 | 0 |
| C(−16) | 0.019 | 0.016 | 0.011 | 0.004 | 0.000 | 0 | 0 | 0 | 0 | 0 | 0 |
| C(−17) | 0.017 | 0.014 | 0.009 | 0.003 | 0.000 | 0 | 0 | 0 | 0 | 0 | 0 |
| C(−18) | 0.016 | 0.012 | 0.008 | 0.002 | 0.000 | 0 | 0 | 0 | 0 | 0 | 0 |
| C(−19) | 0.014 | 0.011 | 0.006 | 0.002 | 0.000 | 0 | 0 | 0 | 0 | 0 | 0 |
| C(−20) | 0.013 | 0.010 | 0.005 | 0.001 | 0.000 | 0 | 0 | 0 | 0 | 0 | 0 |
| C(−21) | 0.012 | 0.009 | 0.005 | 0.001 | 0.000 | 0 | 0 | 0 | 0 | 0 | 0 |
| C(−22) | 0.011 | 0.008 | 0.004 | 0.001 | 0.000 | 0 | 0 | 0 | 0 | 0 | 0 |
| C(−23) | 0.010 | 0.007 | 0.003 | 0.001 | 0.000 | 0 | 0 | 0 | 0 | 0 | 0 |
| C(−24) | 0.009 | 0.006 | 0.003 | 0.001 | 0.000 | 0 | 0 | 0 | 0 | 0 | 0 |

In the table a positive motion speed denotes a movement from left-to-right, and a negative motion speed denotes a movement from right-to-left. Negative coefficients CL affect pixels to the left of the center pixel C(0), and positive coefficients CR refer to the pixels to the right of the center pixel. As expected, there is a one to one mirrored correspondence between the positive coefficients and the negative coefficients for speeds with opposite sign. For example: coefficient 16 for a speed −32 is identical to coefficient −16 for speed 32.

As shown in FIG. 2, the horizontal speed corrected signal HSC is applied to the coefficient lookup-table FIRCLUT via a delay means D applying the horizontal speed corrected signal HSC with a delay corresponding to a delay of a central tap pixel CTP to the FIR-filter coefficient lookup-table FIRCLUT of the FIR-filter FIR, so that the value of the speed of the central tap pixel SCTP for selecting the set of filter coefficients C (0) fits to the central tap pixel CTP of the component signal B shifted through the delay means D of the FIR filter FIR. The FIR filter FIR controlled by the horizontal speed corrected signal HSC processes the component signal B of the video component signals R, G, B for driving luminous elements having a shorter response time like a low pass filter to reduce phosphor lag artifacts on the display device. Arrangement and method require in comparison to line memories and an edge detector less expenditure and provide improved noise performance as an edge detection of the moving object is not necessary and motion estimation signals are used. That means that low-pass filtering the colour component signal of a video signal, which corresponds to the fastest colour component of a display device, dependent on a horizontal moving speed signal generated from motion vectors of a moving object to be displayed on the display device is an efficient method to reduce phosphor artifacts and to discolour edges or trails at black-white or white-black transitions of the moving object to be displayed on the display device as it is illustrated in FIG. 6. FIG. 6 shows the same elements as shown in FIG. 5 with the difference that edges of the moving object are discoloured as pixel having different response time have a similar illumination characteristic due to processing the colour component signal of a video signal according to the invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The invention claimed is:

1. An apparatus for processing video component signals of different colour to be displayed on a display device having at least two kinds of luminous elements with different response time, the apparatus comprising:

a compensation unit supplied by a component signal of the video component signals for driving luminous elements with a shorter response time for compensating differences in the response time and providing a corrected component signal for driving the luminous elements of the display device, wherein the compensation unit is connected with a horizontal speed correction unit supplied with a horizontal motion estimation signal and a vertical motion estimation signal of moving objects to be displayed on the display device for providing a horizontal speed corrected signal controlling said compensation unit with a filter selector supplied by said horizontal speed corrected signal for selecting a set of filter coefficients according to the applied horizontal speed corrected signal and wherein said filter coefficients are determined pixel by pixel according to the horizontal speed magnitude of moving objects to be displayed on the display device and applied to the video component signals for driving luminous elements with a shorter response time for providing the corrected component signal for driving the luminous elements.

2. The apparatus according to claim 1, wherein said compensation unit comprises an FIR-filter supplied by the component signal of the video component signals for driving luminous elements having a shorter response time and a filter selector supplied by the horizontal speed corrected signal.

3. The apparatus according to claim 1, wherein the horizontal speed correction unit comprises a multiplier supplied with the horizontal motion estimation signal and a lookup table supplied by the vertical motion estimation signal for controlling the gain of the horizontal speed correction unit.

4. The apparatus according to claim 2, wherein the FIR-filter has a FIR-filter coefficient lookup-table comprising sets of filter coefficients for a predetermined number of pixels of the display device including a central pixel coefficient for different horizontal speed corrected signals and wherein filter coefficients of each set of filter coefficients form a FIR-filter gain equal to 1.

5. The apparatus according to claim 2, wherein the FIR-filter has a low-pass filter characteristic increasing with said horizontal speed corrected signal.

6. The apparatus according to claim 1 further comprising a motion estimator generating said horizontal motion estimation signal and said vertical motion estimation signal according to a moving object included in at least one component signal of the video component signals to be displayed on the display device.

7. The apparatus according to claim 2, wherein said filter selector comprises a delay means applying the horizontal speed corrected signal with a delay corresponding to a delay of a central tap pixel to a FIR-filter coefficient lookup-table of the FIR-filter.

8. The apparatus according to claim 1, wherein several compensation units and the horizontal speed correction unit are provided, and wherein each compensation unit has a FIR-filter coefficient lookup-table wherein sets of filter coefficients for a certain horizontal speed corrected signal are different.

9. A method for processing video component signals of different colour to be displayed on a display device having at least two kinds of luminous elements with different response time, the method comprising the steps of:

performing a horizontal spatial equalisation of the response time of luminous elements with different response time by finite impulse response filtering a component signal of the video component signals in a compensation unit for driving luminous elements with a shorter response time; and determining filter coefficients pixel by pixel according to the horizontal speed magnitude of a horizontal speed corrected signal generated from a horizontal motion estimation signal and a vertical motion estimation signal of moving objects to be display on the display in a horizontal speed compensation unit dependent on a horizontal speed of changes of the component signal of moving objects to be display on the display device to reduce phosphor lag artifacts on display devices.

10. The method according to claim 9, wherein a said performing horizontal spatial equalisation of the response time of the luminous elements with different response time comprises using an FIR filter.

11. The method according to claim 9, further comprising applying a finite impulse response filter characteristic increasing with a horizontal speed corrected signal to the component signal of the video component signals for driving luminous elements having a shorter response time.

12. The method according to claim 11, further comprising generating said horizontal speed corrected signal from a horizontal motion estimation signal by attenuating the horizontal motion estimation signal with a vertical motion estimation signal for applying phosphor lag compensation only to moving contours of a moving object suffering from phosphor lag.

13. The method according to claim 9, further comprising generating a sliding average value from a component signal of the video component signals for driving luminous elements having a shorter response time.

* * * * *